United States Patent
Sankaranarayanan et al.

(10) Patent No.: US 9,123,356 B2
(45) Date of Patent: Sep. 1, 2015

(54) DETECTING TRACK INFORMATION FROM OVERLAPPING SIGNALS READ FROM A DATA STORAGE MEDIUM

(71) Applicant: Seagate Technology LLC, Cupertino, CA (US)

(72) Inventors: Sundararajan Sankaranarayanan, Fremont, CA (US); Raman Venkataranmani, Longmont, CO (US); William Michael Radich, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 13/712,913

(22) Filed: Dec. 12, 2012

(65) Prior Publication Data
US 2014/0160590 A1    Jun. 12, 2014

(51) Int. Cl.
G11B 5/02 (2006.01)
G11B 5/09 (2006.01)
G11B 20/10 (2006.01)
G11B 5/012 (2006.01)

(52) U.S. Cl.
CPC *G11B 5/09* (2013.01); *G11B 5/012* (2013.01); *G11B 5/02* (2013.01); *G11B 20/10046* (2013.01); *G11B 20/10212* (2013.01); *G11B 2020/10953* (2013.01)

(58) Field of Classification Search
CPC .......... G11B 5/012; G11B 5/02; G11B 5/48; G11B 5/531; G11B 5/82; G11B 20/10046; G11B 5/00865; G11B 2020/10953
USPC .......... 360/18, 22, 45, 47, 48, 55, 63, 64, 135
See application file for complete search history.

(56) References Cited

U.S. PATENT DOCUMENTS

| | | | |
|---|---|---|---|
| 6,816,093 B1 * | 11/2004 | Jaquette | 341/51 |
| 7,564,933 B2 | 7/2009 | Marrow | |
| 7,978,797 B2 | 7/2011 | Marrow | |
| 8,111,477 B2 * | 2/2012 | Nakagawa | 360/77.12 |
| 8,300,339 B1 * | 10/2012 | Nangare et al. | 360/39 |
| 8,599,508 B1 * | 12/2013 | Burd | 360/39 |
| 8,830,613 B2 * | 9/2014 | Lund et al. | 360/45 |
| 2005/0007690 A1 * | 1/2005 | Wong et al. | 360/77.06 |
| 2007/0242378 A1 * | 10/2007 | Ikegami et al. | 360/39 |
| 2011/0181978 A1 * | 7/2011 | Rub | 360/55 |

* cited by examiner

Primary Examiner — Thomas Alunkal
(74) Attorney, Agent, or Firm — Hollingsworth Davis, LLC (57) ABSTRACT

Detecting track information involves receiving first and second overlapping track signals from first and second read elements that read first and second tracks from a data storage medium. Information of the first and second tracks is estimated using the respective first and second track signals. An improved information estimate of the first track is obtained using the first track signal and the estimated information of the second track, and an improved information estimate of the second track is obtained using the second track signal and the estimated information of the first track. First and second track data are decoded using the respective improved information estimates of the first and second tracks.

20 Claims, 7 Drawing Sheets

DETECTING TRACK INFORMATION FROM OVERLAPPING SIGNALS READ FROM A DATA STORAGE MEDIUM

SUMMARY

The present disclosure is related to systems and methods that facilitate detecting track information from overlapping signals read from a data storage medium. In one embodiment, detecting track information involves receiving first and second overlapping track signals from first and second read elements that read first and second tracks from a data storage medium. Information of the first and second tracks is estimated using the respective first and second track signals. An improved information estimate of the first track is obtained using the first track signal and the estimated information of the second track, and an improved information estimate of the second track is obtained using the second track signal and the estimated information of the first track. First and second track data are decoded using the respective improved information estimates of the first and second tracks.

These and other features and aspects of various embodiments may be understood in view of the following detailed discussion and accompanying drawings

BRIEF DESCRIPTION OF THE DRAWINGS

In the following diagrams, the same reference numbers may be used to identify similar/same components in multiple figures.

DETAILED DESCRIPTION

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

Figure 1:
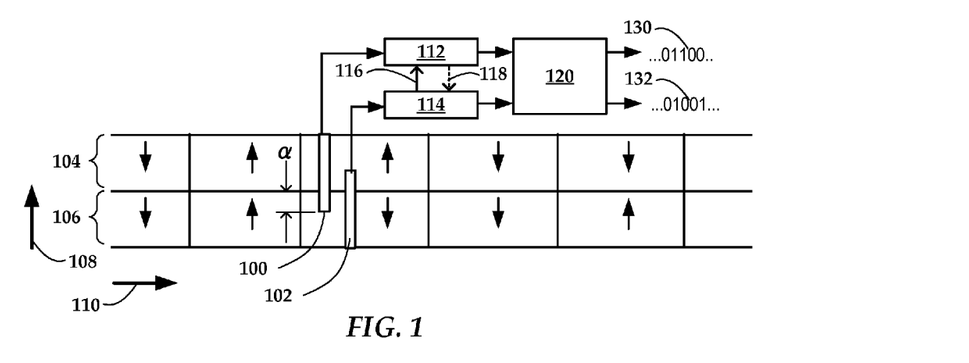
FIG. 1 is a block diagram illustrating a read element arrangement according to an example embodiment.

Increases in areal density (AD) of magnetic data storage devices may be achieved by aggressively decreasing bits-per-inch (BPI) and tracks-per-inch (TPI) on the recording media. Current challenges in decreasing TPI (e.g., squeezing tracks closer together) include increasing the possibility of the read-head picking up interference from adjacent tracks. The read-head interference can be due to track mis-registration (TMR) or just by design, as in two-dimensional magnetic recording (TDMR) systems that utilize a read element that is wider than a single track width. For example, as seen in FIG. 1, read elements 100 and 102 are wider than data tracks 104 and 106, resulting in significant adjacent track interference. Note that the probability of TMR increases with aggressive squeeze on track pitch. In either case, interfering signals may need to be carefully dealt with in order to exhibit performance and reliability that is comparable to existing storage devices.

Two-dimensional magnetic recording is approach to deal with high TPI by using read/write elements that are larger/wider than the track pitch. Current read/write technologies may exhibit performance degradations as size of the read/write element decreases to match the scale of the reduced track dimensions. These degradations may be seen even in cases where the track dimensions have not gone below the superparamagnetic limit. Read elements with smaller track width may have signal-to-noise ratio lowered to a point that it becomes difficult to reliably read data. Write elements with smaller widths may generate smaller magnetic fields, making it difficult to reliably write data.

A recording architecture proposed to increase TPI using existing magnetic recording technologies is known as "shingled" magnetic recording (SMR). Shingled recording may also be referred to as high track density recording (HTDR) and/or banded recording. Shingled recording involves writing tracks that overlap part of previously written tracks. This can result in narrower tracks, thereby increasing TPI, yet can utilize write elements that are wider than the resulting track width, thereby ensuring adequate magnetic fields are generated to write the tracks. A shingled recording device may operate differently than a conventional drive in some aspects. For example, because of the write element overlap, individual tracks cannot be randomly written without disturbing neighboring tracks. Such a device usually writes a relatively large group of tracks together as a block, and so may provide facilities (e.g., non-volatile cache, identification of random and sequential data streams) for dealing with small, random updates so that overall performance is not significantly impacted.

A shingled device may also need provisions to deal with reading the reduced-width tracks. As with the write element, the read element of a shingled recording device may also be wider than a single track width, resulting in overlapping read signals being obtained from two or more tracks. Existing inter-track interference cancellation schemes may assume that signals from an adjacent/encroaching track are relatively small and/or due to noise. As a result, such decoding schemes may not be suited for ultra-high-density track recording schemes, such as where the read element is significantly wider (e.g., 10% wider or more) than a single track width.

The embodiments described below are generally directed to detecting data from a read element that obtains signals from at least one read element that encompasses two or more track widths. While the present embodiments may be applicable to reading data from a shingled recording device, the embodiments may be applicable to other drive architectures, e.g., HAMR and BPM. The read element width results in a significant portion of an interfering track signal being mixed with the target track signal. Individual signals within a combined signal can be detected with a multiple-input, multiple-output (MIMO) detector. A MIMO detector is commonly associated with technologies such as wireless communications, and may provide optimal results with a given signal. However, a MIMO detector is relatively complex compared to a conventional hard drive detector/decoder.

The present disclosure relates to devices that iteratively cancel interference from one or more adjacent tracks to detect information of a target track. These embodiments may approach performance of an optimal MIMO detector, yet at a lower complexity than a MIMO detector. These embodiments may be used in any device where two or more signals are being processed to detect information in the signals, including a hard disk drive device having a read element that encompasses two or more tracks. In the examples below, a detector is coupled to receive signals from two read elements that concurrently read first and second tracks. However, this may be extended to more than two read elements and/or tracks.

In reference now to FIG. 1, a block diagram illustrates an example of a device that has two read elements 100, 102 (also referred to herein as "readers") that concurrently read first and second tracks 104, 106 from a data storage medium according to an example embodiment. While embodiments described herein may describe the use of two read elements, the embodiments may also be applicable to a single-read-element arrangement, where the data from two or more tracks are read one after another, and then processed together after a sufficient amount of track data has been buffered.

Each of the tracks 104, 106 are separate data tracks. The blocks within the tracks indicate respective bit regions, and arrows within the blocks represent respective bit values in the bit regions. In this illustration, the bit regions are shown aligned between tracks 104, 106. However, the embodiments described herein do not require any alignment between adjacent track bits.

The read elements 100, 102 may be both integrated into a hard drive slider, may be included in separate read heads, or may be commonly mounted to some other structure (e.g., contained in separate sliders that are both mounted to a common head gimbal assembly). The readers 100, 102 may be offset from each other in at least a cross-track direction (indicated by arrow 108), and also in a down-track direction (indicated by arrow 110). The cross-track offset results in a portion of at least one of the readers 100, 102 encompassing an adjacent track. For example reader 100 is positioned to substantially encompass track 104 and partially encompass track 106. Similarly, reader 102 is positioned to substantially encompass track 106 and partially encompass track 104.

Generally, the read elements 100, 102 may be arranged to encroach into an adjacent track by a known or predictable amount, e.g., overlap $\alpha$ for read element 100. This overlap $\alpha$ controls the amount of interference picked up by the read element. As the overlap $\alpha$ increases, the amount of adjacent track interference also increases. While the overlap $\alpha$ may be predictable based on read element width and track pitch, the overlap $\alpha$ is not necessarily a fixed amount, but may change with TMR effects. When the mean of overlap $\alpha$ is zero, then it corresponds to a single read-head picking up interference due to TMR effects. When the mean of overlap $\alpha$ is non-zero by a significant amount, then the arrangement may be considered as TDMR architecture. The iterative detection methods described hereinbelow may be generally applicable to TDMR architectures, including architectures with single or multiple read elements that serially or concurrently read overlapping tracks.

An adjacent track overlap $\alpha$ of the readers results in each reader 100, 102 detecting first and second track signals. In this arrangement, both readers 100, 102 each obtain signals from both tracks 104 and 106. Reader 100 substantially reads track 104 and partially reads track 106, and reader 102 substantially reads track 106 and partially reads track 104. For purposes of this discussion, "substantially" and "partially" may refer to a relative cross-track region covered by the read elements and/or a relative magnitude of track signals generated by the read elements. Usually, the track being read that has the most substantial signal component is the track of interest for the read element, e.g., the track to which the read element is aligned during read operations. The partially read track is considered an interfering track. It will be understood that the actual proportions of the respective adjacent tracks read may vary statically or dynamically during device operation due to normal sources of error such as head mis-tracking, media defects, etc.

The read elements 100, 102 are coupled to respective detectors 112, 114 that extract information for at least the primary, substantially read track. The detectors 112, 114 are coupled to each other, e.g., via path 114 and optionally via path 116. The paths 116, 118 facilitate iteratively cancelling out the interfering track signals to improve detection of the primary tracks. In this example, path 116 is used to obtain an improved information estimation of track 104 via detector 112 using the signal from read element 100 and estimated information of track 106 provided from detector 114. Similarly, path 118 may be used to obtain an improved information estimation of track 106 via detector 114 using the signal from read element 102 and estimated information of track 104 provided from detector 112.

Both detectors 112, 114 may be run in parallel to process two or more tracks concurrently. Because of the down-track offset between the read elements 100, 102, there may be a phase difference between the signals produced by the read elements. The phase difference can be compensated for in the detectors 112, 114 or other processing circuitry, because the distance between the heads 100, 102 is known, measurable, and/or predictable. Accordingly, phase shifts due to down-track offset can be predicted and accounted for in the detection/decoding circuitry.

The outputs of the detectors 112, 114 are input to a decoder block 120. This decoder 120 may provide additional decoding operations on the detected signals (e.g., error correction codes) to obtain binary output streams 130, 132 of user data. Although the terms "detector" and "decoder" are used for purposes of illustration in describing blocks 112, 114, 120, it will be understood that the detectors 112, 114 may be considered part of (e.g., early stage of) decoder 120, and this description is not meant to limit the applicability, structure, or functionality of the detectors 112, 114 and/or decoder 120. For example, as described in greater detail below, additional components (e.g., canceller, equalizer) may be utilized together with or be integral with detectors 112, 114 and or decoder 120.

As previously noted, the architectures proposed herein can be extended to an M-track and N-heads scenario. Also, this architecture can be applied to recording systems dominated by inter-track and/or adjacent-track interference due to TMR effects, e.g., one-dimensional recording systems with narrow or non-existent guard bands. In short, the scope of the proposed embodiments is more expansive than the particular examples shown herein, and in general, may be applicable to a number of different ultra-high density recording architectures.

Figure 2:
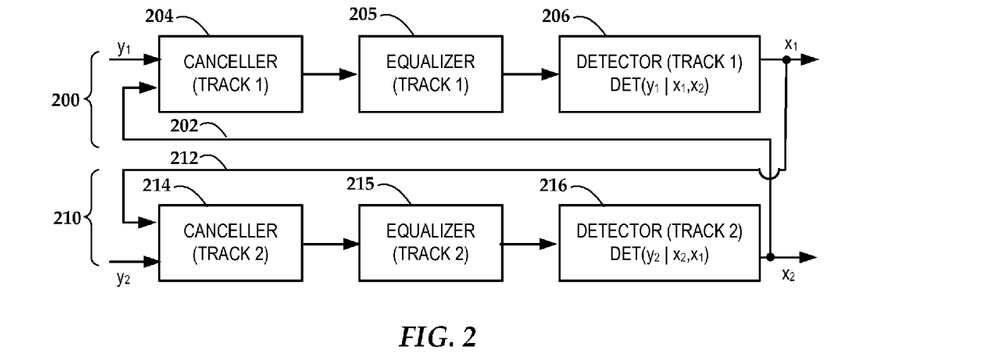
FIG. 2 is a block diagram of an iterative detection scheme according to an example embodiment.

In reference now to FIG. 2, a block diagram illustrates an iterative detection scheme according to an example embodiment. Two processing paths 200, 210 are configured for parallel processing of two concurrently read signals $y_1$ and $y_2$. The signals $y_1$ and $y_2$ correspond to adjacent first and second tracks being concurrently read from a media via first and second read elements. The signals $y_1$ and $y_2$ also respectively contain information $x_2$ and $x_1$ about the other of the first and second tracks, in varying proportions. The other track information $x_2$ and $x_1$ is considered interference to the primary track information $y_1$ and $y_2$.

In processing path 200, the information about $x_2$ in $y_1$ is considered as interference. Therefore, a canceller 204 is used to cancel the interference quantity using and estimate of $x_2$ received from the output of processing path 210 via data path 202. The canceller 204 is coupled to an equalizer 205 and a detector 206. An estimate of $x_1$ is provided by the detector 206, and this estimate is improved via the estimate of $x_2$. In processing path 210, a similar canceller 214 is shown. Data path 212 provides estimate of $x_1$ together with $y_2$ to the canceller 214, thereby obtaining an improved estimate of $x_2$. Having reciprocal cancelling occurring in both paths 200, 210 ensures improvement in the estimation of $x_1$ and $x_2$ during each iteration because estimates of $x_1$ and $x_2$ can be fed back to a next iteration to further improve the estimates of $x_1$ and $x_2$ and more quickly converge on a solution. The cancellation may be performed iteratively until the detection system reaches equilibrium and/or reaches a maximum and/or predetermined number of iterations.

The canceller 204 for the first track signal is a filter that is trained using true bits of $x_2$ to minimize interference from the second track: $\|y_1 - C_1 * x_2\|^2$, where $C_1$ is the canceller for the first track. The canceller 214 for the second track is trained in a similar manner using $y_2$ and true bits of $x_1$. The equalizers 205, 215 may be trained on interference cancelled signals. The detector 206 for the first track works on equalized signal $z_1$ and the detector 216 for the second track works on equalized signal $z_2$.

In the first iteration, estimate of $x_2$ is not available to the canceller 204 for the first track and therefore, detection proceeds without cancellation. The estimate from the detector 206 for the first track is fed into the canceller 214 for the second track. Similarly, the canceller 214 proceeds without an estimate of $x_1$ in the first iteration, and the estimate from the detector 216 of the second track is fed into the canceller 204 of the first track. In subsequent iterations, estimate of $x_1$ and $x_2$ are available for the cancellers 204, 214 of both processing paths 200, 210. It has been observed that the detection system achieves equilibrium after just two iterations.

The architecture shown in FIG. 2 has detector complexity that is similar to that of current channel architectures. For small values of overlap (e.g., $\alpha<0.10$), the loss can be kept to a minimum. The cancellers 204, 214, as described above, may use hard decisions from the detectors 206, 216 and therefore are configured as hard cancellers. The concepts may also be extended to soft cancellers for one or both processing paths 200, 210. The use of soft cancellers may improve the overall performance. Such a soft canceller may use log-likelihood ratios (LLRs) of bits as input from the detector 206, 216 or the decoders.

Figure 3:
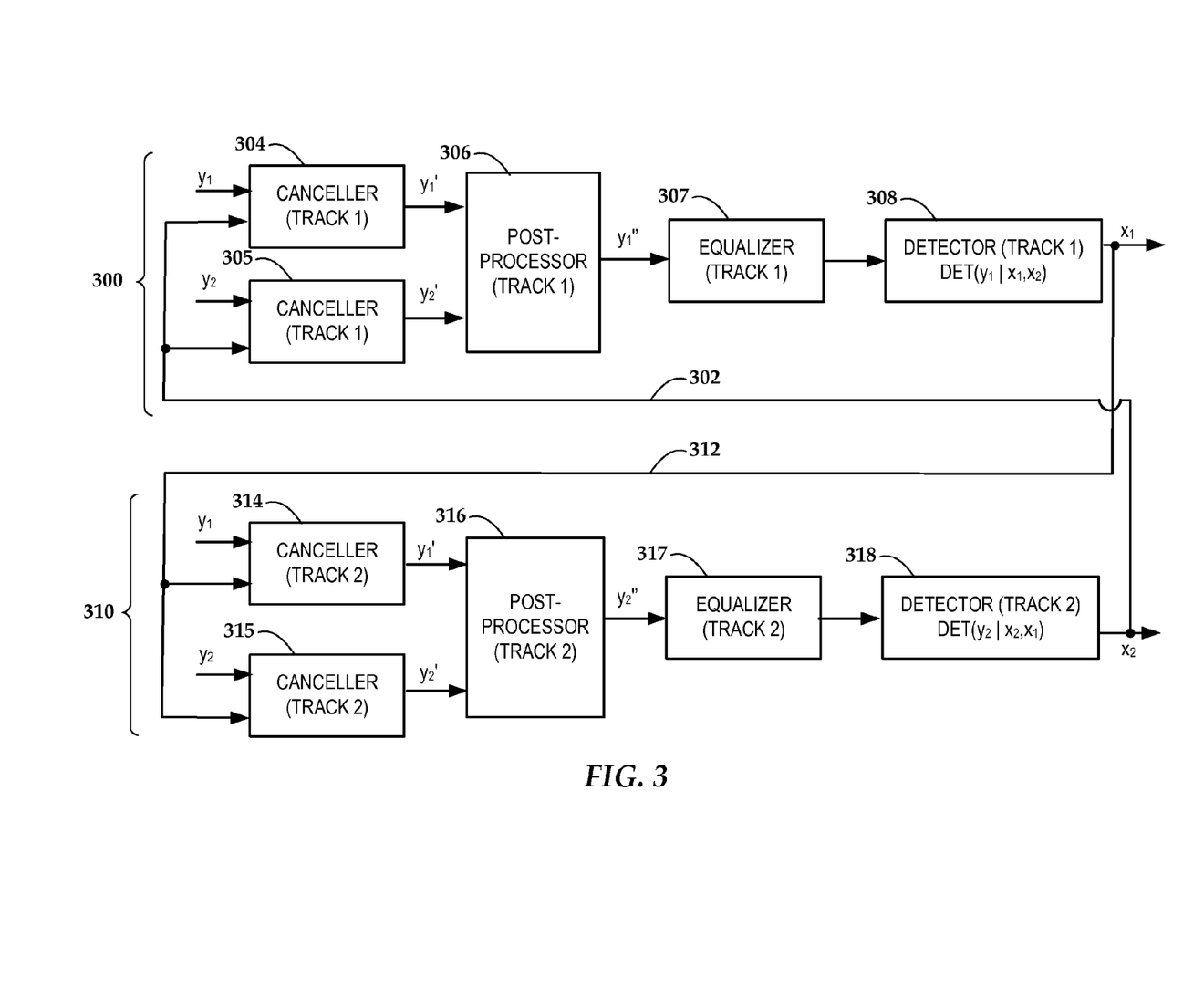
FIG. 3 is a block diagram of an iterative detection scheme according to another example embodiment.

In reference now to FIG. 3, a block diagram illustrates an iterative detection scheme according to another example embodiment. Two processing paths 300, 310 are configured for parallel processing of two concurrently read signals $y_1$ and $y_2$ and provide information estimates $x_1$, and $x_2$, analogous to like named signals/information as shown and described regarding FIG. 2. The first processing path 300 includes two cancellers 304, 305, a post-processor 306, equalizer 307, and detector 308. The second processing path 310 includes two cancellers 314, 315, a post-processor 316, equalizer 317, and detector 318. As with the embodiment shown in FIG. 2, including cancellers in both paths 300, 310 ensures fast convergence on an iterative solution.

In contrast to the embodiment shown in FIG. 2, the first track processing path 300 includes a canceller 305 that receives input from the other track ($y_2$) as well as the canceller 304 that receives input from its own track ($y_1$). Both $y_1$ and $y_2$ contain information about $x_1$ (and $x_2$) but the embodiment shown in FIG. 2 uses only $y_1$ (after cancellation) to estimate $x_1$. The version of iterative scheme shown in FIG. 3 obtains this additional information from the other track by using two cancellers, one for each track, which brings the total number of cancellers to four.

For the first track, both $y_1$ and $y_2$ are passed through cancellers 304, 305 to remove interference from $x_2$. Outputs $y_1'$, $y_2'$ of the cancellers 304, 305 are input to a post-processing unit 306. The post-processing unit 306 combines $y_1'$ and $y_2'$ linearly in a way to maximize resultant signal-to-noise ratio (SNR). The output $y_1''$ from post-processing unit 306 is input to the equalizer block 307. The resulting improved estimate of $x_1$ is provided via the detector 308. Processing path 310 performs similar processing for the second track. A number of iterations and/or information exchanges are allowed between blocks 300 and 310, and the number of iterations may be predetermined or variable.

The configuration shown in FIG. 3 (as well as the configuration shown in FIG. 2) may work well with turbo-equalization schemes. The performance of these configurations may also be improved by incorporating soft cancellers. It will be understood that a hybrid between the embodiments shown in FIGS. 2 and 3 may be possible. For example, one processing path may take have single canceller that takes in only one input signal $y_1$ or $y_2$, while the other processing path may have two cancellers that take in both input signals $y_1$ and $y_2$. For more than two concurrently read tracks, there may be any combination of canceller paths having single, double, and higher-multiple numbers of cancellers and associated track signal.

The cancellers, post-processor and equalizers for each processing path 300, 310 may be implemented in a number of ways. In reference now to FIG. 4, a block diagram illustrates an alternate configuration of a detection architecture shown in FIG. 3. The arrangement shown in FIG. 4 uses a combination canceller/equalizer 404, 414 for respective processing paths 400, 410. These canceller/equalizers 404, 414 may include two cancellers, a post processor, and equalizer as shown in FIG. 3. The canceller/equalizers 404, 414 may include alternate structures, e.g., a single canceller, multiple equalizers, etc.

Figure 4:
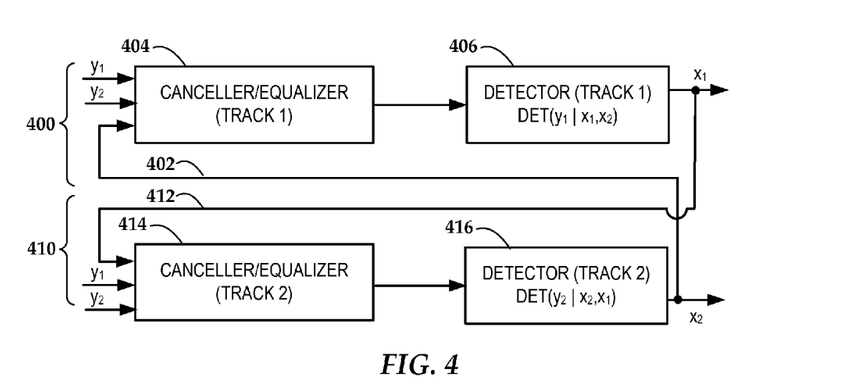
FIG. 4 is a block diagram of an iterative detection scheme according to another example embodiment.
Figure 5:
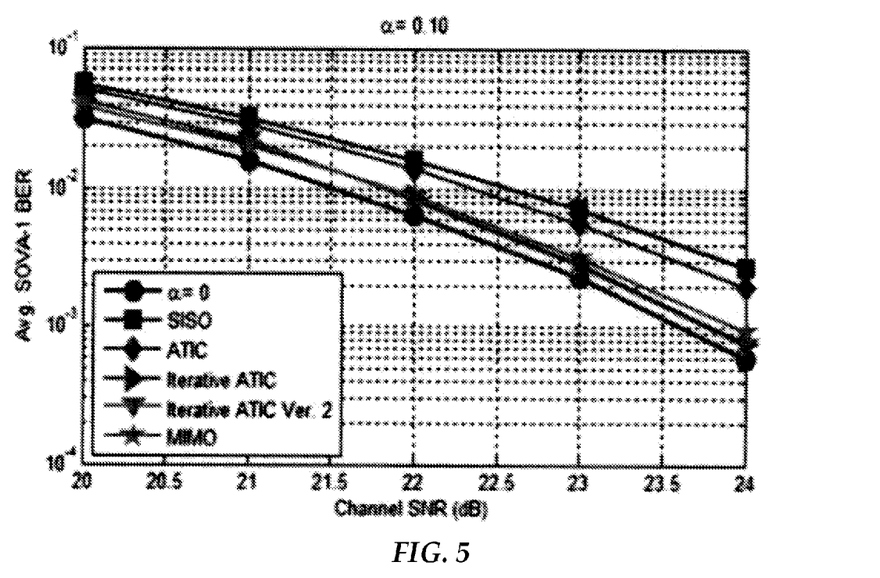
FIGS. 5-8 are graphs comparing performance of different detection schemes according to example embodiments.
Figure 6:
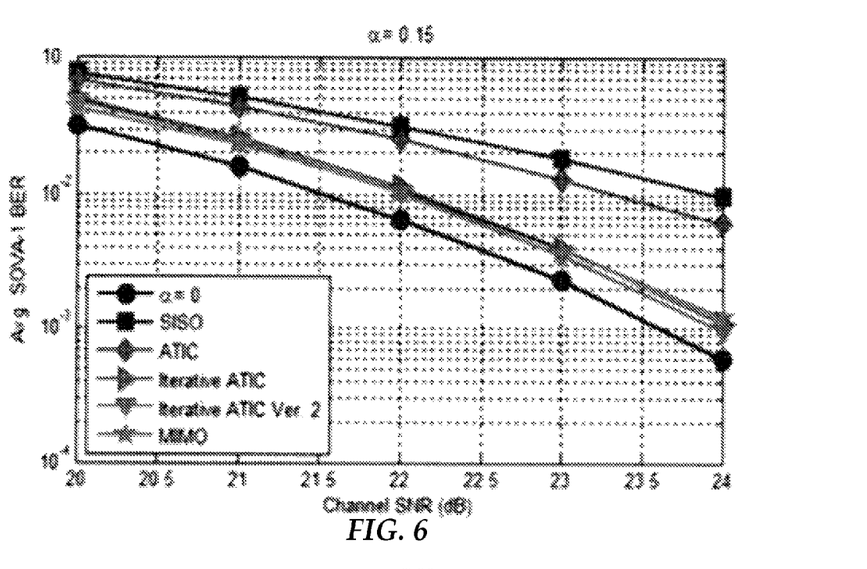
Figure 7:
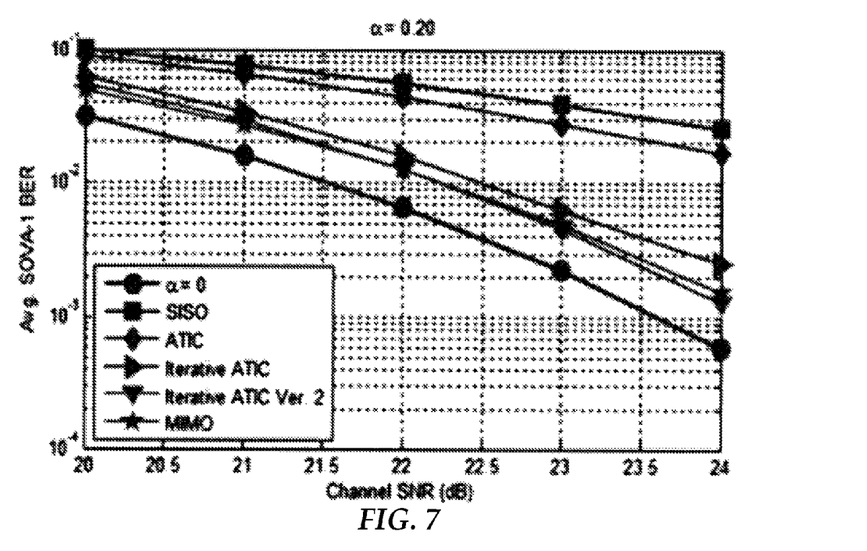

The equalizer/canceller blocks 404, 414 each take three input vectors: $y_1$, $y_2$, and the estimate ($x_2$ or $x_1$) of the interference signal from the other path. During the training stage, true bits written on one of the tracks (e.g., first track) may be used. Note it is possible to extend the blocks 404, 414 to take in log-likelihood estimates of $x_2$ and/or $x_1$ instead of the hard decisions. The cancellers of the blocks 404, 414 (as well as other cancellers described above in FIGS. 2 and 3) can be designed using a minimum mean squared error (MMSE) or other suitable criterion. The post-processor and the equalizer portions can be combined into one unit. In such a case, an MMSE or other suitable criterion can be used to equalize two inputs to the post-processor unit to a partial response (e.g., monic, fixed) target.

In FIGS. 5-8, graphs compare the approaches above with other signal detection approaches. The graphs of FIGS. 5-7 each include plots of bit error rate (BER) versus channel SNR for different detections scheme. The plots in each figure are for different detection schemes using overlap of $\alpha=0.10$, 0.15, and 0.20 for FIGS. 5-7, respectively. Each graph also include a plot of theoretical maximum performance of the system modeled, where $\alpha=0$. The detection schemes shown in each graph include single-input, single output (SISO), Adjacent Track Interference Cancellation (ATIC), MIMO, and the embodiments illustrated in FIG. 2 (Iterative ATIC) and FIG. 3 (Iterative ATIC, Ver. 2).

The ATIC architecture referred to in FIGS. 5-8 represents a single iteration of the embodiment illustrated in FIG. 2 (Ver. 1) scheme. During the first iteration, interference in the first track doesn't get cancelled while interference in the second track gets cancelled using estimates from detector of the first track, and as a result no iteration takes place. The MIMO scheme is an optimal detection scheme that processes $y_1$ and $y_2$ read backs as a single unit. The MIMO detector is significantly more complex than the architectures shown herein, e.g., in FIGS. 2-4.

Figure 8:
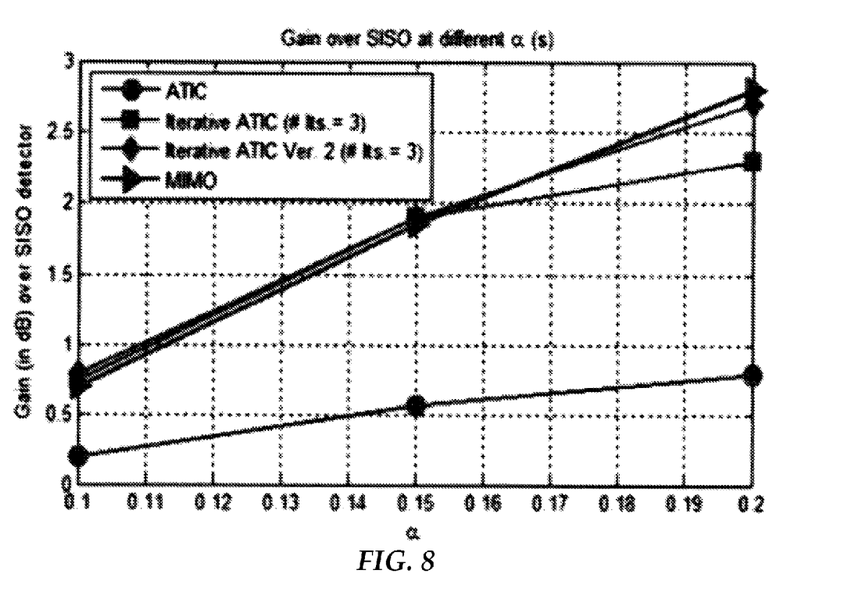

In all of the graphs, the SISO architecture exhibits the highest BER. This is due to this architecture treating interference as noise, and not as a substantial interference signal. The ATIC architecture shows a slight improvement over SISO, although not as much as the Iterative ATIC and Iterative ATIC Ver. 2. In these simulations, the Iterative ATIC converges after two iterations and approaches the performance of the MIMO detector for 10% and 15% interference factors shown in FIGS. 5 and 6. For the larger interference factor of 20% shown in FIG. 7, the Iterative ATIC Ver. 2 matches the performance of the optimal MIMO detector. The Iterative ATIC does not fare as well as Iterative ATIC Ver. 2 at $\alpha=0.20$, although still significantly improves over ATIC at that level of interference. In FIG. 8, a graph illustrates a comparison of the gain in dB over SISO for the detection schemes discussed above. For both Iterative ATIC versions, the number of iterations is three, although it has been observed that similar results may be obtained using two iterations.

In this document, two proposed architectures, Iterative ATIC Ver. 1 (shown in FIG. 2) and Iterative ATIC Ver. 2 (shown in FIGS. 3 and 4) have been shown to match performance with that of the optimal, but complex, MIMO detector. The proposed architectures allow for easier implementation in hardware and open the possibility of re-using existing detector blocks in currently used channel chips. In both iterative schemes, detectors for both data processing paths can be operated independently. These iterative schemes are expected to enhance system performance in devices with decreased distances between physical tracks. As mentioned above, these concepts may be extended to M-tracks and N-heads devices, and extended to the use of soft cancellation.

Figure 9:
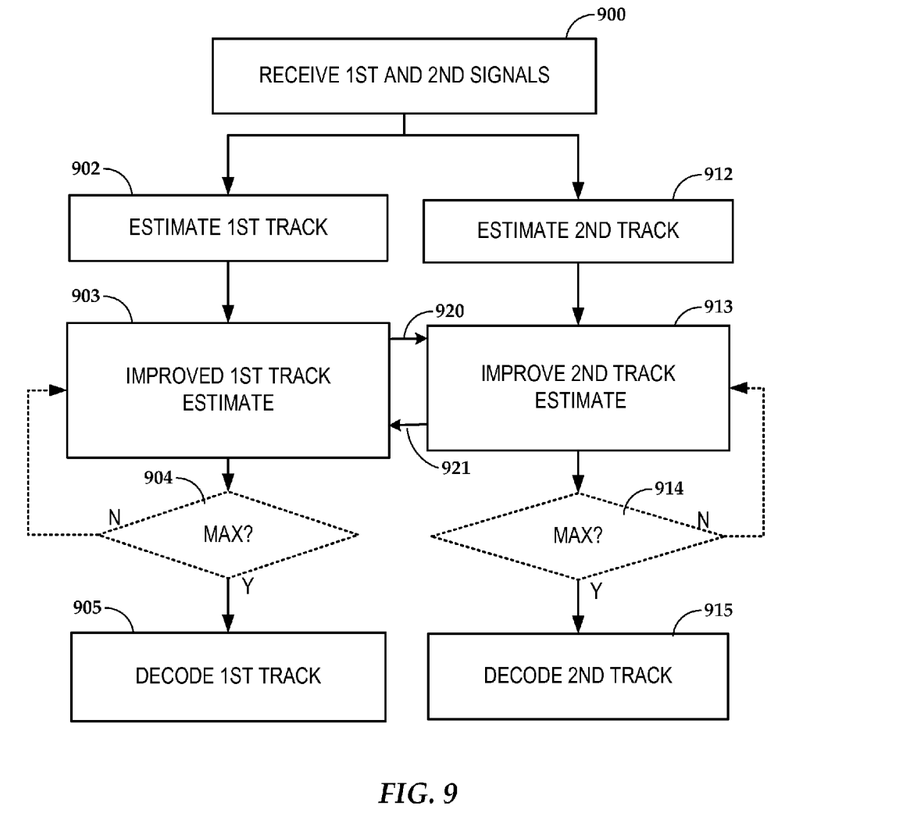
FIG. 9 is a flowchart illustrating a procedure according to an example embodiment.

In reference now to FIG. 9, a flowchart illustrates a procedure according to an example embodiment. First and second track signals are received 900 from first and second read elements that concurrently read first and second tracks from a data storage medium. Information of the first and second tracks are estimated 902, 912 using the respective first and second track signals. An improved information estimate of the first track is obtained 903 using the first track signal and the estimated information of the second track. An improved information estimate of the second track is obtained 913 using the second track signal and the estimated information of the first track. First and second track data is decoded 905, 915 using the improved information estimate of the first track.

As indicated by optional blocks 904, 914, the improved estimates obtained at 903, 913 may be iteratively repeated until a convergence is reached (e.g., a minimal change of estimates between iterations), and/or until a predefined number of iterations has been performed. Generally, there may not need to be a test for convergence. For example, use of turbo equalization, which is the process of iterating between decoder and detector, may ensure convergence for a set number of iterations. In such a case, running the decoder and extracting a priori LLR from the decoder estimates can help detector convergence and facilitate running all blocks in parallel.

During the first and subsequent processing via blocks 903, 913, improved information from the other track from a previous iteration may be used to obtain an improved estimate of a track. This information exchange is indicated by the arrows 920, 921 between blocks 903, 913. While blocks 902-905 and 912-915 may be construed as parallel processing paths, the operations may also be performed in series in a single processing path. Similarly, the first and track signals received at block 900 may be obtained from a single read element that reads the tracks in series. In such a case, the procedure may involve buffering data from the first track while the second track is read.

Figure 10:
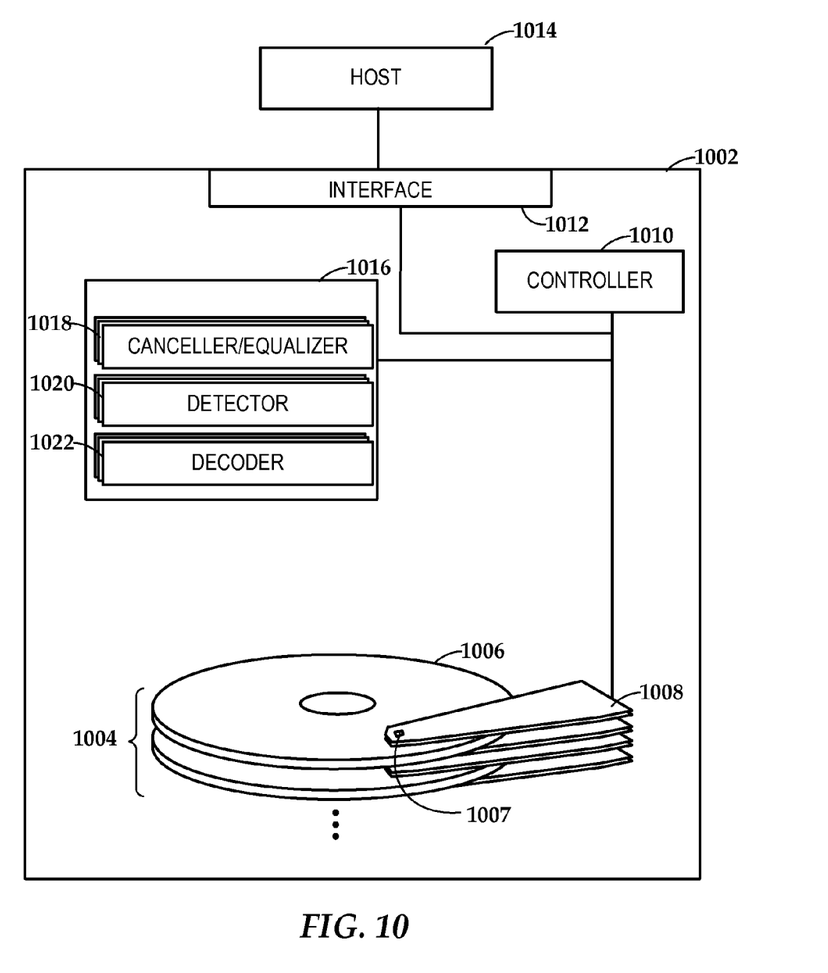
FIG. 10 is a block diagram illustrating an apparatus according to an example embodiment.

In reference now to FIG. 10, a block diagram illustrates an apparatus 1002 according to an example embodiment. The apparatus 1002 may be configured as a conventional or hybrid hard disk drive. The apparatus 1002 includes a storage medium 1004 that in this example includes one or more magnetic disks 1006. The disks 1006 store data as magnetic patterns that are read by transducers 1007 (e.g., magnetic read/write heads) mounted on a pivoting arm assembly 1008. There may be more than one read and/or write transducer 1007 for each media surface, such as described in some embodiments above.

A controller 1010 is coupled to the arm assembly for both controlling movement of the arm via an actuator (not shown) and sending and receiving signals to one or more read/write heads on the arms. The controller 1010 may also provide other functions of the apparatus, such as controlling operations of a host interface 1012 that communicatively couples the apparatus 1002 to a host 1014. The host interface 1012 is a communications interface that allows the host 1014 to store and retrieve information to/from the medium 1004. The host interface 1012 may utilize standard communication interfaces and protocols, such as SATA, SCSI, eSATA, SAS, USB, Thunderbolt, WiFi, etc. The host interface 1012 provides both a standard means of communication between the apparatus 1002 and host 1014, as well as abstracting operations of the controller 1010 and media 1006. For example, the host 1014 may access data by way of logical block addresses (LBAs) that are mapped internally to a different physical addressing scheme, e.g., based on cylinders, heads, and sectors.

The apparatus 1002 may include various features described herein to increase AD of data stored on medium 1004. For example, the transducers 1007 and controller 1010 may write data in such a way as to increase track density. Those techniques, such as shingled recording, HAMR, BPM, multi-level signal recording, have been discussed in greater detail above. In order to take advantage of the data recording at these higher densities, the apparatus 1002 may also include a number of functional modules 1016 that facilitate reading back this data.

The functional modules may include any combination of discrete analog and digital circuits, general-purpose logic devices, firmware and/or software. Generally, the modules may each be operable via one or more processors, which may be part of or separate from the device controller 1010. For example, a plurality of canceller/equalizers 1018 may be coupled to a plurality of read elements of transducers 1007. Read elements of the transducers 1007 may each span more than one data track, and jointly process signals from adjacent tracks. The jointly processed signals may be sent to a plurality of detectors 1020 used to obtain improved estimates of the tracks. The canceller/equalizers 1018 and detectors 1020 may perform these improved estimates iteratively, and the resulting improved information is sent to one or more decoders 1022 that process the detected information for each track. It will be appreciated that the canceller/equalizers 1018 and detectors 1020 may be considered respective front stages of the decoders 1022, in which case the components 1018, 1020, and 1022 may together be considered one or more decoders.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate managing information detection in data storage devices as described above.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A method comprising:
   receiving first and second overlapping track signals from first and second read elements that read first and second tracks from a data storage medium;
   estimating information of the first and second tracks using the respective first and second track signals;
   concurrently obtaining an improved information estimate of the first track from a first detector using the first track signal and the estimated information of the second track while obtaining an improved information estimate of the second track from a second detector using the second track signal and the estimated information of the first track; and
   concurrently decoding first and second track data using the respective improved information estimates of the first and second tracks.

2. The method of claim 1, wherein the first and second read elements concurrently read first and second tracks from the data storage medium.

3. The method of claim 1, wherein the operations of obtaining the improved information estimates of the first and second tracks are performed in parallel.

4. The method of claim 1, wherein the operations of obtaining the improved information estimate of the first and second tracks are iteratively repeated, wherein the improved information estimate of the first and second tracks from one iteration are used as the respective estimated information for a next iteration.

5. The method of claim 1, wherein obtaining the improved information estimate of the first track comprises using the first and second track signals and the estimated information of the second track, and wherein obtaining the improved information estimate of the second track comprises using the first and second track signals and the estimated information of the first track.

6. The method of claim 5, wherein obtaining the improved information estimate of the first and second tracks comprises:
   filtering the first and second track signals with the estimated information of the respective second and first tracks to obtain respective filtered first and second signals; and
   combining the filtered first and second signals.

7. The method of claim 1, wherein obtaining the improved information estimate of the first track comprises cancelling the estimated information of the second track from the first track signal and wherein obtaining the improved information estimate of the second track comprises cancelling the estimated information of the first track from the second track signal.

8. The method of claim 1, wherein obtaining the improved information estimate of the first and second tracks comprises using a hard estimate of the respective second and first tracks.

9. The method of claim 1, wherein obtaining the improved information estimate of the first and second tracks comprises using a log-likelihood ratio estimate of the respective second and first tracks.

10. The method of claim 1, wherein the first read element substantially reads the first track and partially reads the second track, and wherein the second read element substantially reads the second track and partially reads the first track.

11. An apparatus comprising:
    first and second processing paths associated with first and second overlapping track signals concurrently decoded from a data storage medium, the first processing path comprising:
       a first canceller that filters the first track signal using the first track signal and estimated second track information; and
       a first detector coupled to the output of the first canceller and providing estimated first track information in response to the filtering of the first track signal; and
    the second processing path comprising:
       a second canceller that filters the second track signal using the second track signal and the estimated first track information; and
       a second detector coupled to the output of the second canceller and providing the estimated second track information in response to the filtering of the second track signal, the estimated second track information provided concurrently with the estimated first track information.

12. The apparatus of claim 11, wherein the first and second processing paths operate in parallel.

13. The apparatus of claim 11, wherein the first and second processing paths perform a first iteration wherein the first and second cancellers do not filter the respective first and second track signals based on the respective estimated second and first track information, and a second iteration wherein the first and second cancellers filter the respective first and second track signals based on the respective estimated second and first track information obtained from the first iteration.

14. The apparatus of claim 11, wherein the first processing path further comprises:
    a third canceller that filters the second track signal based on the estimated information from the second track signal;
    a first post-processor coupled between the first and third cancellers and the first detector, the post-processor combining the outputs of the first and second cancellers.

15. The apparatus of claim 11, further comprising a first equalizer coupled between the first canceller and the first detector and a second equalizer coupled between the second canceller and the second detector.

16. The apparatus of claim 11, wherein the first and second detectors provide one or more of hard estimates and log-likelihood ratio estimates of the respective first and second track signals.

17. The apparatus of claim 11, wherein the first processing path substantially reads the first track and partially reads the second track, and wherein the second processing path substantially reads the second track and partially reads the first track.

18. The apparatus of claim 11, wherein the apparatus comprises at least one of a two-dimensional magnetic recording device or a shingled magnetic recording device.

19. An apparatus comprising:
   a data storage medium;
   first and second read heads that concurrently read first and second overlapping track signals from the magnetic data storage medium; and
   signal processing circuitry coupled to the first and second read heads, the signal processing circuitry configured to:
      estimate information of the first and second tracks using the respective first and second track signals;
      concurrently obtain an improved information estimate of the first track from a first detector using the first track signal and the estimated information of the second track while obtaining an improved information estimate of the second track from a second detector using the second track signal and the estimated information of the first track; and
   concurrently decode first and second track data using the respective improved information estimates of the first and second tracks.

20. The apparatus of claim 19, wherein obtaining the improved information estimate of the first and second tracks comprises respectively using both the first and second track signals and the estimated information of the respective second and first tracks.

* * * * *